United States Patent [19]

Raymond-Seraille

[11] Patent Number: 4,744,823

[45] Date of Patent: May 17, 1988

[54] PROCESS FOR THE PURIFICATION OF METALS BY FRACTIONAL CRYSTALLISATION

[75] Inventor: André Raymond-Seraille, Vicdessos, France

[73] Assignee: Aluminum Pechiney, France

[21] Appl. No.: 947,600

[22] Filed: Dec. 30, 1986

[30] Foreign Application Priority Data

Jan. 6, 1986 [FR] France ............................. 86 00399

[51] Int. Cl.$^4$ ............................................. C22B 21/00
[52] U.S. Cl. ........................................ 75/68 R; 75/63
[58] Field of Search .................................. 75/63, 68 R

[56] References Cited

U.S. PATENT DOCUMENTS

| | | | |
|---|---|---|---|
| 3,211,547 | 10/1965 | Jarrett | 75/68 R |
| 3,543,531 | 12/1970 | Adams | 75/63 |
| 3,671,229 | 6/1972 | Ferber | 75/211 |
| 4,221,590 | 9/1980 | Dawless | 75/68 R |
| 4,456,480 | 6/1984 | Wintenberger | 75/68 R |

*Primary Examiner*—Peter D. Rosenberg

*Attorney, Agent, or Firm*—Jones, Day, Reavis & Pogue

[57] ABSTRACT

The invention relates to a process for the purification of metals and in particular aluminium by fractional distillation. The process which comprises:

(a) causing progressive solidification within a volume of liquid metal which is maintained in the vicinity of its melting point in an externally heated container by immersing therein an internally cooled body;

(b) collecting at the bottom of the container all of the small crystals which are formed, (c) by compacting causing sintering of the small crystals to produce large crystals; and (d) separating the purified fraction consisting of large crystals from the liquid fraction which is enriched in respect of impurities, by tilting the container;

is characterized in that, to increase the purification action, the container is maintained in its tilted position to drain off the purified fraction.

The invention is used in particular in the purification of aluminium where it makes it possible for example directly to reduce the amount of iron from 800 to 1 ppm.

5 Claims, No Drawings

PROCESS FOR THE PURIFICATION OF METALS BY FRACTIONAL CRYSTALLISATION

The present invention relates to an improvement in the process for the purification of metals, in particular aluminium, by fractional crystallisation, the subject of French Pat. No. 1 594 154, in order to enhance the level of effectiveness of the purification action.

The man skilled in the art is aware that, when an alloy solidifies, an element which is capable of forming a eutectic mixture with the base metal and which is present in the alloy in a smaller amount than the eutectic content is concentrated in the liquid phase in such a way that the crystals which are initially formed have a higher level of purity in respect of that element than the starting alloy. That is still true if the element is an impurity which is even present in the form of traces.

Theoretically, the concentration $C_S$ of the impurity in the crystal which is formed is equal to $k\, C_L$ in which $C_L$ is the concentration of the impurity in the liquid and k is the coefficient of solid-liquid partition given by the constitutional diagram.

Thus, the coefficient of purification $\tau$ of the crystal is equal to:

$$\frac{C_L}{C_S} = \frac{1}{k}.$$

It is on the basis of that principle that different processes for the purification of metals by fractional crystallisation have been developed; among such processes, reference may be made more particularly to the process which is the subject of French Pat. No. 1 594 154 and which primarily comprises the following steps:

(a) Causing progressive solidification within a volume of liquid metal which is maintained in the vicinity of its melting point in an externally heated container by immersing therein an internally cooled body, the rate of solidification being regulated by the combined action of the flow of cold fluid, the power of the heating effect which is external to the crucible, and the thermal insulation of the crucible;

(b) Collecting all the small crystals which are formed, in the bottom of the container containing the liquid metal;

(c) By compacting at the bottom of the container by means of a piston, causing sintering of the small crystals to produce large crystals and eliminating the impure interstitial liquid; and (d) Separating the purified fraction comprising large crystals from the liquid fraction which is enriched for example by tilting the container to discharge the fraction which is enriched with impurities when it is still liquid and which forms the supernatant liquid.

As has been demonstrated experimentally and as is shown in the table of the above-mentioned patent, rates of purification which are higher than the theoretical coefficient $\tau$ are obtained. Indeed, for iron and silicon $k_{Fe}=0.03$ and $k_{Si}=0.15$, which gives $\tau_{Fe}=30$ and $\tau_{Si}=7$ whereas the actual coefficients of purification observed are: $\eta_{Fe}{}^{Si}=55$ and $\eta_{Si}=15.5$.

That result is highly surprising, especially if account is taken of the fact that it relates to 50% of the initial mass and therefore crystallisation has occurred from a liquid which is progressively enriched with impurities.

Theoretical and experimental studies have afforded a plausible explanation for that phenomenon:

The small crystals which drop onto the mass which has already been purified and which is formed from large crystals are amassed thereon in the form of a layer made up of the small crystals and their mother liquor. However the latter are no longer in equilibrium with the mother liquor as, since the temperature in the container increases from the top (cooled part) towards the bottom which is heated, they are then at a temperature which is higher than the temperature at which they were formed. The mixture of the small crystals and the mother liquor then tends to be returned to a condition of thermodynamic equilibrium. As stated in the revue de l'Aluminium of May 1974, page 290, and in the Proceedings of the l'Academie des Sciences (volume 272, page 369, series C, 1971), that return to a condition of thermodynamic equilibrium occurs due to re-melting and re-solidification phenomena, and what is finally obtained is:

crystals which are agglomerated to large crystals already existing and which are of the composition given by the solidus of the diagram at the local temperature.

They are therefore purer than the initial small crystals. The higher degree of purification found by experiment is thus explained;

a larger amount of liquid as a part of the initial small crystals has melted in order to reestablish the thermodynamic equilibrium. That liquid is displaced towards the supernatant liquid by the combined effect of the agglomeration of small crystals to large crystals and the action of the piston.

In summary, that therefore progressively produces a practically compact and solid mass of large agglomerated crystals, the composition of which is that of the solids at the temperature at which they are.

Spot analyses (1 $\mu m \times \mu m$) effected using an electronic microprobe, after solidification of the ingot, in the vicinity of the large crystal-liquid metal transition, are in conformity with the above-indicated explanation.

Nonetheless, if the inferior of the purified mass is explored using the same method, it is also found that residues of interstitial liquid still remain in the purified mass, the presence of such residues being revealed by an abrupt increase in the level of concentration of impurities. The interstitial liquid in a condition of thermodynamic equilibrium with large crystals is less pure than the latter $$\left(C_L = \frac{C_S}{k}\right)$$

and therefore decreases the level of efficiency of the purification operation.

To give an example, that effect is particularly intense in relation to iron since the interstitial liquid is about 30 times less pure than the crystals.

The applicants therefore sought to eliminate the above-mentioned liquid which is disseminated in the mass of large crystals but without re-melting the purified solid in order not to reduce the level of yield of the operation.

Many tests were carried out for that purpose. As described in French Pat. No. 1 594 154, page 2, line 36, an attempt was made to modify the rate of crystallisation in the direction of a decrease therein. The pressure of the piston against the mass of purified crystals was also increased. Then, after having removed the impure fraction by the means specified in the patent, the purified mass was replaced in its crucible and the whole was reheated, which resulted in the impure liquid collecting in the bottom of the container.

However, none of those processes provides a substantial purification effect although the latter was found to be relatively effective, but on condition that a substantial fraction of the purified mass was re-melted, which confirms that the teaching of U.S. Pat. No. 3,211,547 was well-founded.

Finally the applicants succeeded by means of the invention which, within the scope of French Pat. No. 1 594 154 and in order to eliminate the interstitial liquid and thus to increase the level of purification of the metal obtained, is characterised in that after having tilted the container to separate the supernatant liquid, the container is maintained in the tilted position in order to drain off the purified fraction until all discharge flow ceases.

The applicants found in fact that, in that position and, and this must be emphasized, in the absence of any heating, liquid oozed or seeped from the purified mass very slowly and over a very long period of time. That operation may last for between 5 minutes and 1 hour approximately. They verified that the drainage liquid was much less pure than the purified mass. Examination after cooling of the purified mass revealed that it had a fine porosity, thus showing that the oozing or seeping liquid is in actual fact interstitial liquid and that therefore the fine porosity is at least for a large part a communicating or open porosity which permits the interstitial liquid to come out of the quasi-compact purified mass.

As will be seen from the following examples of use, it is highly surprising that such a substantial degree of elimination of interstitial liquid can be achieved simply by draining and without heating. Draining off the liquid by tilting the container as carried out herein has the advantage of eliminating the interstitial liquid by beginning with the impurest part thereof, without causing it to pass through the regions where the metal is purest. That result would not be achieved if the drainage operation were carried out, without tilting movement, by way of the bottom of the crucible.

On the other hand the applicants also noted that the proportion of interstitial liquid in the purified mass increases from the bottom towards the top of the vessel so that the tilting movement of the crucible therefore promotes good elimination of the interstitial liquid.

However that drainage operation is very slow and since no heat is applied, a fraction of the interstitial liquid may solidify. It is for that reason that during the drainage operation it is possible to apply heat to the mass of crystals, in an amount just sufficient to compensate for heat losses. That operation does not aim to re-melt the purified mass, which would reduce the yield, but only to prevent the interstitial liquid from solidifying which would thus reduce the level of effectiveness of the drainage operation.

The above-mentioned application of heat may be effected in any known manner and continuously or discontinuously. It is also possible to use the piston intended for the compacting operation—in order to apply to the purified mass a pressure which facilitates expulsion of the interstitial liquid; that action may also be performed continuously or discontinuously.

The application of heat and the application of a pressure simultaneously contribute to a further increase in the level of efficiency of the process.

The invention may be illustrated by reference to the following examples of use thereof:

Four fractions each of 1 tonne and of very similar compositions were taken from an aluminium bath and separately subjected to purification operations using fractional crystallisation, employing the following modes of operation:

Test 1: in accordance with the prior art, with a solidification period of 8 hours;

Test 2: in accordance with the prior art, with a solidification period of 16 hours and increased pressure applied by the piston;

Test 3: in accordance with test 1, carrying out a drainage operation for 45 minutes in accordance with the invention and without the application of heat; and Test 4: in accordance with test 3, with an application of heat to compensate for heat losses and while applying a continuous pressure to the purified fraction throughout the drainage period.

Those results are set forth in the following Table in which:

Fe(O) and Si(O) represent in ppm the initial contents of iron and silicon respectively in the bath, Fe(l) and Si(l) represent the final mean proportions of iron and silicon respectively in the mass of purified metal, in ppm, $\eta$Fe and $\eta$Si represent the ratios between the initial proportions of iron and silicon respectively and the final proportions thereof, and $\rho$ represents the yield in respect of mass:mass of purified metal/mass of initial metal in %.

TABLE

| Test No | Fe(0) | Fe(l) | $\eta$Fe | Si(0) | Si(l) | $\eta$Si | $\rho$ |
|---|---|---|---|---|---|---|---|
| 1 | 839 | 13 | 65 | 258 | 23 | 11 | 64.3 |
| 2 | 795 | 10 | 80 | 276 | 20 | 14 | 65.3 |
| 3 | 768 | 2 | 384 | 223 | 11 | 20 | 58.6 |
| 4 | 804 | 1 | 804 | 316 | 7 | 45 | 53.7 |

It is found that, in regard to iron, by simple drainage without the application of heat (test 3), the level of concentration is more than 6 times lower than what it was with the prior art (test 1). In regard to silicon, the purification action is less effective but nonetheless the level of concentration is divided approximately by 2.

With compensation for heat losses and the application of a pressure (test 4), the result is even clearly better since, still in relation to the prior art (test 1), the level of concentration of iron is divided by 13 and the level of concentration of silicon is divided by more than 3.

The yield in respect of mass falls relatively little since it goes from 64% with the prior art to about 59% using simple drainage and close to 54% in test 4.

It will be seen from test 2 that doubling the solidification time gives little improvement.

In the four tests, operation was concluded by cooling the container and sawing to eliminate the upper part of the purified mass made up of large crystals, contaminated by remains of supernatant liquid at the end of the compacting operation, and the operation of sawing off the purified part was always carried out at the same height in the ingot.

In tests 3 and 4, the lower yield $\rho$ in respect of mass is due to the elimination of the interstitial liquid which leaves a porosity in the purified mass.

Thus, the present invention accordingly constitutes a very clear advance over the prior art.

I claim:

1. In a process for the purification of metals by fractional crystallization comprising the steps of:
    (a) immersing an internally cooled body into an externally heated container containing a volume of liquid metal to progressively solidify said liquid metal to form purified metal crystals and a supernatant liquid metal containing concentrated impurities;
    (b) collecting said crystals in the bottom of said container;
    (c) compacting said crystals to form a purified mass of metal crystals;
    (d) separating said purified mass from said supernatant liquid metal by tilting the container to drain off said supernatant liquid metal;
    the improvement which comprises, after said supernatant liquid metal has drained, maintaining the container in its tilted position for a period of from 5 minutes to 1 hour to drain interstitial liquid from said purified mass to thereby improve the purity of said mass.

2. A process according to claim 1 wherein during drainage of the interstitial liquid heat is applied to said purified mass in an amount just sufficient to compensate for heat losses.

3. A process according to claim 1 wherein pressure is applied to said purified mass during drainage of said interstitial liquid.

4. A process according to claim 2 wherein pressure is applied to said purified mass simultaneously with the application of heat during drainage of the interstitial liquid.

5. A process according to claim 1 wherein the liquid metal is aluminum.

* * * * *